United States Patent [19]

Hunger

[11] Patent Number: 4,749,201
[45] Date of Patent: Jun. 7, 1988

[54] SEALING UNIT AND A PROCESS FOR SEALING PARTS

[76] Inventor: Walter Hunger, Otto-Nagler-Strasse 13, Wuerzburg, Fed. Rep. of Germany

[21] Appl. No.: 798,920

[22] Filed: Nov. 18, 1985

[30] Foreign Application Priority Data

Nov. 27, 1984 [DE] Fed. Rep. of Germany ....... 3443220

[51] Int. Cl.⁴ .......................... F16J 15/16; F16J 15/56
[52] U.S. Cl. ................... 277/165; 277/188 A; 277/198; 277/227; 428/217; 428/218
[58] Field of Search ................. 428/64, 65, 217, 218; 277/188 R, 188 A, 165, 195, 198, 227

[56] References Cited

U.S. PATENT DOCUMENTS

| | | | |
|---|---|---|---|
| 2,456,356 | 12/1948 | Aber | 277/188 A |
| 3,149,848 | 9/1964 | Galloway et al. | 277/165 |
| 3,405,959 | 10/1968 | Walker | 277/74 |
| 3,687,465 | 8/1972 | Grime et al. | 277/188 R |
| 4,040,636 | 8/1977 | Albertson et al. | 277/188 A |
| 4,052,112 | 10/1977 | Faber | 277/188 A |
| 4,053,166 | 10/1977 | Domkowski | 277/165 |
| 4,204,716 | 5/1980 | Baylor | 277/206 R |

FOREIGN PATENT DOCUMENTS

| | | |
|---|---|---|
| 856815 | 11/1952 | Fed. Rep. of Germany . |
| 1182913 | 7/1965 | Fed. Rep. of Germany . |
| 1475772 | 12/1969 | Fed. Rep. of Germany . |
| 2110156 | 9/1972 | Fed. Rep. of Germany . |
| 137790 | of 1961 | U.S.S.R. . |
| 418262 | 8/1974 | U.S.S.R. . |
| 653467 | 3/1979 | U.S.S.R. . |
| 838218 | 6/1981 | U.S.S.R. . |
| 1086264 | 4/1984 | U.S.S.R. . |

OTHER PUBLICATIONS

T. M. Bashta, "Mashinostroitelnaya gidravlika", Moscow, Mashinostroenie, 1971, p. 609, FIG. 379.
V. K. Zhitomirsky, "Mashinostroenie, Moscow, 1964, p. 106, FIG. 4.

Primary Examiner—William J. Van Balen
Attorney, Agent, or Firm—Schwartz, Jeffery, Schwaab, Mack, Blumenthal & Evans

[57] ABSTRACT

Disclosed is a sealing unit comprising a soft sealing ring and a thrust ring which has a greater hardness than the sealing ring. The two rings are permanently connected along a central surface of contact (b). Also disclosed is a process for producing the sealing unit comprising the steps of extruding both the sealing ring and the thrust ring, and then connecting the extruded rings along the central surface of contact.

14 Claims, 3 Drawing Sheets

FIG. 3
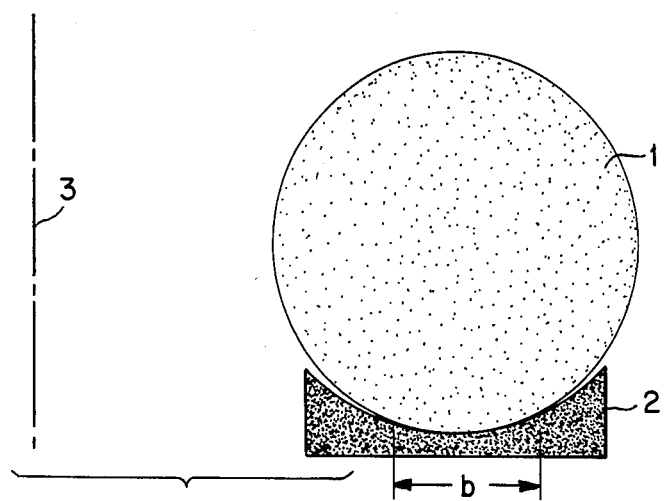
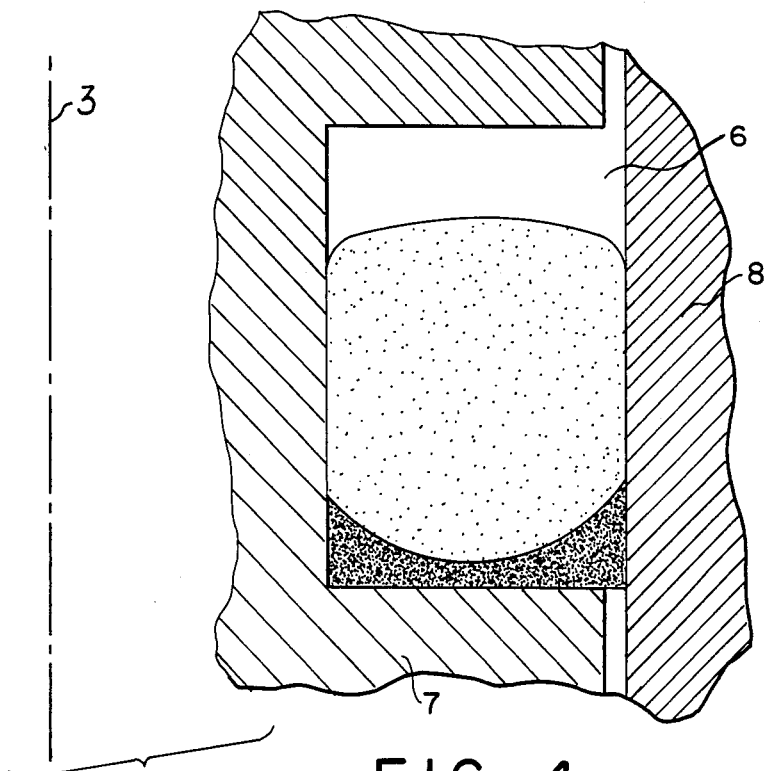
FIG. 4

SEALING UNIT AND A PROCESS FOR SEALING PARTS

BACKGROUND OF THE INVENTION

The present invention relates to a sealing unit comprising a soft sealing ring and a back-up ring which is harder than the soft sealing ring. The present invention also relates to a process for producing such sealing units.

Sealing units of this type are known in many forms and consist of separate parts. Although the dimensions and shapes of the thrust ring and sealing ring are matched to one another, they are nevertheless not connected to one another. The function of the back-up ring is to prevent a possible extrusion of the sealing ring into the gap between the machine elements. In other words, the thrust ring eliminates the danger that the sealing ring will be squeezed into the gap between the particular machine elements under an excess pressure exerted on one side.

One disadvantage of these known sealing units is that, if not fitted carefully, the sealing ring which is usually an O-ring of circular, i.e., toroidal, cross-section will possibly be inserted and inherently twisted into the receiving groove of the machine part to be equipped with the sealing unit. This reduces the sealing effect and the service life of the sealing unit. Especially where polyoxymethylene back-up rings are concerned, this can lead to rapid wear because the sealing ring is peeled off in layers.

A further disadvantage of the prior sealing units is that the known sealing units can only be used where the use was intended from the outset because of appropriate dimensions of the receiving groove. In machine parts with grooves, in which only a sealing O-ring is inserted, they cannot serve as a substitute for this O-ring since the fitting space is not sufficient for the back-ring which also has to be incorporated. This prevents the possibility of substituting a sealing unit leak-proofing means for a leak-proofing means consiting only of an O-ring, although this would often be desirable in order to increase the resistance to gap extrusion.

SUMMARY OF THE INVENTION

Therefore, an object of the present invention is to provide a sealing unit which, while being simple to produce, can be used even where simple O-ring seals have been used hitherto.

A further object of the present invention is to provide a sealing unit which, while ensuring a high degree of safety against gap extrusion, is not adversely affected by careless fitting.

Thus, in accordance with one aspect of the present invention, there is provided a sealing unit, comprising a soft sealing ring and a back-up ring having a hardness greater than the soft sealing ring and being permanently connected to the soft sealing ring along a central surface of contact (b).

Because the sealing ring and back-up ring are permanently connected at a central surface of contact, the thrust ring acquires from the sealing ring a certain resistance to bending stresses exerted in its cross-sectional plane and can therefore be made substantially thinner than an independent thrust ring. The central wall thickness, that is to say, the wall thickness of the back-up ring at its thinnest point, can be reduced to a value of a few hundredths of a millimeter, thus decisively lowering the amount of space required in comparison with known sealing units and making it possible to use the sealing unit according to the present invention as a substitute for simple O-ring seals.

Again, for the reasons mentioned, the thrust ring in the design according to the present invention can comprise a substantially softer material, for example, elastomers, than the back-up rings of known sealing units. This is a further additional advantage of the invention, because the back-up ring provides for improved sealing in this way.

The sealing unit according to the invention can be used in any relative geometrical arrangement. The sealing ring can be located radially on the inside, radially on the outside or behind the back-up ring in the axial direction, i.e., on the side of lower pressure when pressure differences are to be sealed off.

In accordance with another aspect of the present invention, there is provided a process for producing a sealing unit as described above, comprising the steps of extruding a sealing ring, extruding a back-up ring, and connecting the sealing ring to the back-up ring along a central surface of contact. The sealing ring and back-up ring can be connected by means of gluing or welding.

Other objects, features, and advantages of the present invention will become more apparent from the detailed description of preferred embodiments which follows, when considered with the attached figures of drawing.

BRIEF DESCRIPTION OF THE DRAWING

In the drawing:

FIG. 3 shows a sealing unit comprising a sealing ring located in front of a back-up ring in the axial direction;

FIG. 4 shows the sealing unit according to FIG. 3 when fitted;

DETAILED DESCRIPTION OF THE PREFERRED EMBODIMENTS

Figure 1:
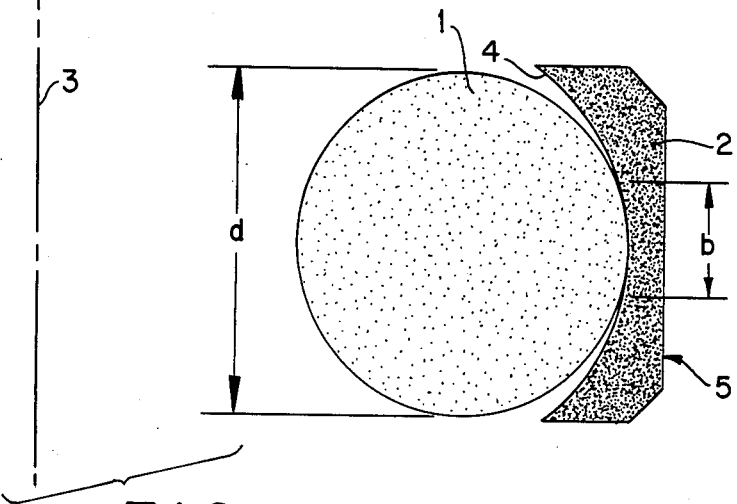
FIG. 1 shows a sealing unit comprising a radially inner sealing ring and a back-up ring surrounding it, in a cross-section through only one circumferential point.
Figure 2:
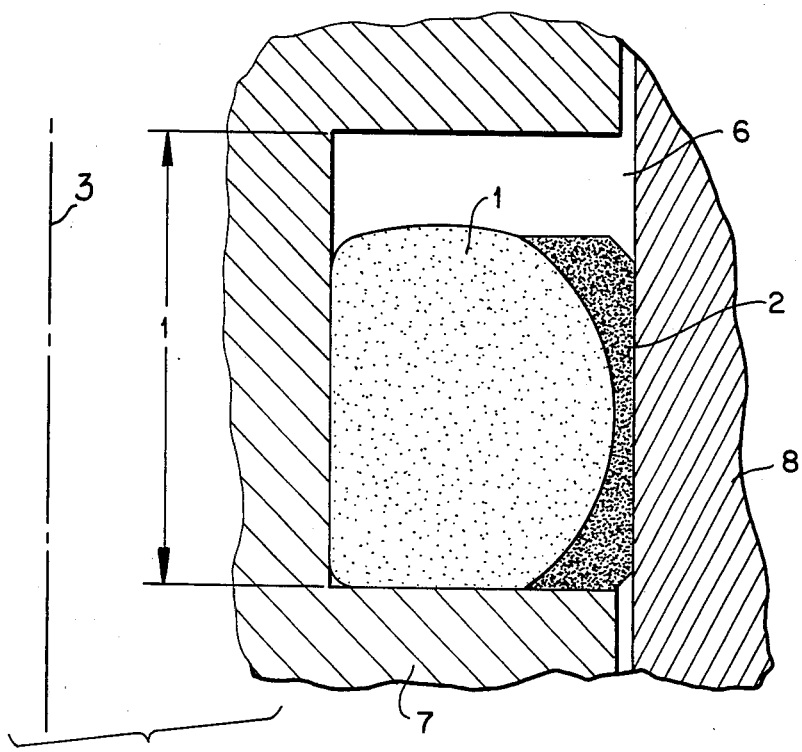
FIG. 2 shows the sealing unit according to FIG. 1 when fitted.

The sealing unit according to FIGS. 1 and 2 comprises a radially inner sealing ring 1, in relation to the direction of the axis 3 (the distance between the latter and the sealing unit not being true to scale), and a back-up ring 2 surrounding the sealing ring 1. The sealing ring 1 is an O-ring in the form of a torus. In other words, the sealing ring has a cross-section which is circular at right angles to the circumferential direction. The back-up ring 2 has a concave thrust surface 4 facing the sealing ring 1 and an annular plane rear surface 5.

The two rings are permanently connected to one another, for example, by means of gluing or welding, on a cental contact portion b. The width b of the connecting portion is selected so that the two rings remain held together even under rough handling, for example, during packaging, storage, unpacking and fitting.

FIG. 2 shows the sealing unit when fitted, for example, when it is inserted into the groove 6 of a rod or shaft 7, and by means of the rear surface 5 of the back-up ring 2 rests against the wall of the bore in a housing 8 or the like.

The width of the groove 6 is greater than the axial extension of the sealing unit, so that the latter will always rest against the side wall of the groove on which the lower pressure prevails. In both cases, the back-up ring 2 reliably prevents extrusion of the sealing ring 1 into the gap between the rod 7 and the housing 8. Also, it is impossible for the sealing ring 1 to undergo rolling of the sealing unit creeps in the axial direction in the groove 6.

FIG. 3 shows a design in which the sealing ring 1 and the back-up ring 2 are arranged axially behind one another. FIG. 4 shows the sealing ring 1 and the back-up ring 2 when fitted, the circumstances being that the excess pressure always arises on the same side. In other words, the excess pressure is exerted from above in FIG. 4.

Figure 5:
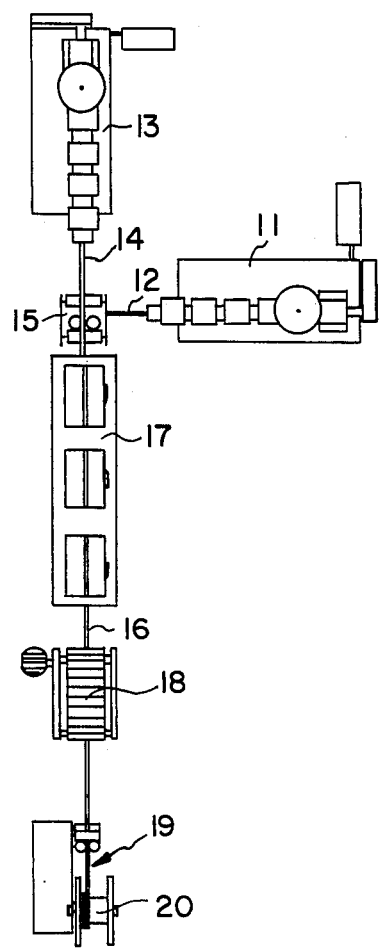
FIG. 5 shows diagrammatically an installation for producing sealing units.

FIG. 5 shows an apparatus for producing double extrusions from which the sealing units are then made. The extruder 11 produces an extrusion 12 which later forms the sealing ring, and the extruder 13 produces an extrusion 14 which later forms the thrust ring. The two extrusions 12 and 14 are brought together, for example, in a welding device 15 in which they are pressed against one another at such a temperature and with such a consistency that welding takes place on the connection portion b.

Subsequently, the double extrusion 16 formed in this way passes through a cooling device 17, for example, a water bath, and, after running through a collar-mounted draw-off device 18 ensuring conveyance, arrives at a winding-on device 19. The winding-on drum 20 of the winding-on device 19 has approximately the diameter of the final sealing units to be produced.

It goes without saying that the double extrusion 16 runs onto the winding-on drum 20 in an alignment corresponding to the subsequent sealing unit. Thus, when sealing units of the type shown in FIGS. 1 and 2 are to be produced, the double extrusion is wound on with the sealing-ring extrusion 12 on the inside. Correspondingly, when sealing units of the type shown in FIGS. 3 and 4 are to be produced, the sealing-ring and thrust-ring extrusions are wound on next to one another.

After the complete cooling of the double extrusion, the latter already has the required curvature, and the sealing units are produced by cutting off the length necessary for the particular diameter. The cutting is performed by means of a diagonal cut or a wedge cut. The ends of the portion are then glued or welded together.

What is claimed is:

1. A sealing unit for sealing longitudinally moving parts, comprising:
   a soft sealing ring comprising an O-ring having a generally circular radial cross section in an undeformed condition defining an arcuate surface having a first radius of curvature;
   a back-up ring having a hardness greater than said soft sealing ring, and a first surface facing said arcuate surface of said sealing ring, said back-up ring having a plano-concave cross-sectional shape, wherein said first surface of said back-up ring comprises a concave shape having a second radius of curvature larger than said first radius of curvature of said sealing ring, and said back-up ring has a second generally flat surface on its side opposite to said first surface; and
   wherein said first surface and said arcuate surface of said sealing ring in undeformed condition are in contact with one another only along a central surface of contact at approximately the middle portion of said concave shape and are secured only along said central surface of contact, leaving areas on said arcuate surface on both sides of said central surface which are unsecured and not initially in contact with said first surface, so as to permit movement of said arcuate surface relative to said back-up ring.

2. A seaing unit as claimed in claim 1, wherein said concave surface terminates at both ends in sharp points formed with side surfaces of said back-up ring which extend essentially normal to said flat surface of said back-up ring.

3. A sealing unit as claimed in claim 1, wherein said back-up ring is positioned behind said sealing ring in a radial direction.

4. A sealing unit as claimed in claim 1, wherein said back-up ring is positioned behind said sealing ring in a axial direction.

5. A sealing unit as claimed in claim 4, wherein said central surface of contact comprises the radially inner or outer circumferential surface.

6. A sealing unit as claimed in claim 1, wherein a minimum wall thickness of said back-up ring is less than about 0.1 times the diameter of said sealing ring.

7. A sealing unit as claimed in claim 1, wherein said sealing ring is welded to said back-up ring.

8. A sealing unit as claimed in claim 7 wherein said sealing ring is made from an elastically deformable material.

9. A sealing unit as claimed in claim 1, wherein said back-up ring comprises an elastomer material.

10. A sealing unit as claimed in claim 1, wherein said back-up ring has a minimum thickness in the region of its central surface of a few hundredths of a millimeter.

11. An apparatus comprising:
    a first part;
    a second part in longitudinally slidable contact with said first part; and
    a sealing unit as defined by claim 1 interposed between said first and second parts 12. An apparatus as claimed in claim 11 wherein said first part has a groove cut from a surface which faces said second part, and said soft sealing ring and said back-up ring are dispose therein.

13. A method for sealing longitudinally movable parts comprising the steps of:
    providing a sealing unit as described in claim 1; and
    sealing a first part with a second part which is longitudinally movable relative to said first part by interposing said sealing unit between said first and second parts.

14. A method as claimed in claim 13 wherein said sealing step includes placing said sealing unit between said first and second parts and into a groove cut from said first part.

* * * * *